United States Patent [19]

Hashimoto et al.

[11] 4,338,375
[45] Jul. 6, 1982

[54] SURFACE COATING COMPOSITION

[75] Inventors: Kaname Hashimoto, Sakai; Saizo Ikeda, Himeji, both of Japan

[73] Assignee: Daicel Chemical Industries, Ltd., Osaka, Japan

[21] Appl. No.: 153,242

[22] Filed: May 27, 1980

[30] Foreign Application Priority Data

Jun. 6, 1979 [JP] Japan .................................. 54-70740

[51] Int. Cl.³ .......................... B32B 27/36; B05D 3/02
[52] U.S. Cl. ................................ 428/412; 106/287.14;
106/287.16; 427/163; 427/164; 427/165;
427/167; 427/168; 427/169; 427/387;
427/388.2; 427/389.7; 427/393; 428/429;
428/447; 428/450
[58] Field of Search ...................... 427/387, 388.2, 393,
427/389.7, 165, 169, 162, 163, 240, 421, 164,
167, 168; 428/412, 451, 429, 447, 450; 252/8.7,
8.9, 351, 353, 354, 356; 106/287.14, 287.16;
528/20, 26, 901, 29, 34, 10, 43

[56] References Cited

U.S. PATENT DOCUMENTS

| | | | |
|---|---|---|---|
| 3,451,838 | 6/1969 | Burzynski et al. | 428/412 |
| 3,642,880 | 2/1972 | Sweeney et al. | 252/353 X |
| 4,024,306 | 5/1977 | Takamizawa et al. | 427/387 |
| 4,173,490 | 11/1979 | Rotenberg et al. | 106/287.14 |
| 4,275,118 | 6/1981 | Baney et al. | 106/287.16 X |

Primary Examiner—Michael R. Lusignan
Assistant Examiner—Thurman K. Page
Attorney, Agent, or Firm—Blanchard, Flynn, Thiel, Boutell & Tanis

[57] ABSTRACT

A surface coating composition comprising:
(A) 100 parts by weight of a partially hydrolyzed condensation product of alkyltrialkoxysilane having the general formula $$R^1Si(OR^2)_3$$

in which $R^1$ represents an aliphatic hydrocarbon group of $C_1$–$C_4$ or an aromatic hydrocarbon group, and $R^2$ represents an aliphatic hydrocarbon group of $C_1$–$C_4$;
(B) 10–100 parts by weight of an organic carboxylic acid of $C_1$–$C_5$; and
(C) 0.01–1.0 part by weight of an anionic surface active agent containing a fluorocarbon chain.

11 Claims, No Drawings

SURFACE COATING COMPOSITION

This invention relates to a surface coating composition capable of providing an abrasion resistant surface, and particularly to a surface coating composition which can be coated and hardened on the surface of a plastic material and which possesses excellent transparency, abrasion resistance, heat resistance, adhesion to the base material and water resistance.

Plastic materials have been applied to a variety of uses due to their desirable characteristics such as high impact resistance, easy moldability and light weight. However, they have the drawback that the surface of a molded plastic material is apt easily to be scratched. Accordingly, it has been proposed to form a hardened coating of an organopolysiloxane resin on the surface of a molded plastic material for the purpose of improving the abrasion resistant property of the surface of the plastic material. Thus, it is known that a coating solution comprising an organo-polysiloxane that can be hardened by reaction and a hardening catalyst is coated on the surface of a plastic material and is hardened by heating to form a hardened coating having a good abrasion resistant property as disclosed in, for example, Japanese Provisional Patent Publication No. 50(1975)-143,822.

However, a coating produced simply by cross-linking the organopolysiloxane to a higher level by the use of a hardening catalyst has a poor sliding property, due to its high friction coefficient. Therefore, it is important to improve the poor sliding property by producing a smoother coated surface so as to provide an improved abrasion resistant property. In the field relating to coating technology, it is known to use a surface active agent as a leveling agent to provide a smooth coated surface. Nevertheless, conventional surface active agents do not provide a satisfactory leveling effect to a coating solution containing an organopolysiloxane. When an increased amount of a surface active agent is added to improve the smoothness of the surface, the adhesion property of the coating composition to the base material is apt to decrease, the coated film is apt to be made opaque due to the poor solubility of the surface active agent in the organopolysiloxane, or pinholes may be produced in the film surface when the film is immersed in water. The last defect is caused by the incorporated surface active agent being dissolved in the water so that it escapes from the film. Thus, a fully satisfactory surface active agent for this specific purpose is not known.

In addition, it is known to add a volatile acid to a coating solution containing an organopolysiloxane capable of being hardened by reaction, for the purpose of improving the pot life, as is disclosed in, for example, Japanese Provisional Patent Publication No. 52(1977)-152,425.

In the coating procedure, the coated material is brought into contact with an alkaline hardening catalyst after being dried. Since the hardening time of organopolysiloxane coatings is much longer than is required for general coating materials, the surface active agent should have improved acid resistance, alkali resistance and heat resistance. However, a surface active agent fully satisfying these requirements is not known.

As stated above, no leveling agent is known that shows fully satisfactory performance when employed with a surface coating composition containing an organopolysiloxane. Accordingly, it has been desired to provide a surface active agent that can impart, when used in a small amount, a satisfactory smoothness to the coated surface and that provides satisfactory acid resistance, alkali resistance and heat resistance. After extensive studies, the present inventors have discovered a surface coating composition that avoids the drawbacks stated above, namely, it is excellent in the abrasion resistant property, heat resistance, adhesion to the base material, water resistance and surface smoothness, as well as in transparency.

The present invention, accordingly, is a surface coating composition comprising:

(A) 100 parts by weight of a partially hydrolyzed condensation product of an organotrialkoxysilane having the general formula

in which $R^1$ represents an aliphatic hydrocarbon group of $C_1$–$C_4$ or an aromatic hydrocarbon group, and $R^2$ represents an aliphatic hydrocarbon group of $C_1$–$C_4$;

(B) 10–100 parts by weight of an organic carboxylic acid of $C_1$–$C_5$; and (C) 0.01–1.0 parts by weight of an anionic surface active agent containing a fluorocarbon chain.

The surface coating composition of the invention is dissolved in a solvent, such as an alcohol, to obtain a coating solution. If desired, a hardening catalyst can be added to the coating solution. The thus-obtained coating solution is coated on the surface of a material, such as plastic material, metal, wood, glass, etc., and is hardened by drying to give a surface film having an excellent abrasion resistant property. Particularly, by incorporating the anionic surface active agent having a fluorocarbon chain, the produced surface film is excellent in transparency, abrasion resistant property, heat resistance, adhesion to the base material, water resistance, surface smoothness and friction resistance.

The organotrialkoxysilane of the present invention is represented by the general formula $R^1Si(OR^2)_3$, in which $R^1$ is an aliphatic hydrocarbon group of $C_1$–$C_4$, such as methyl, ethyl, propyl or butyl, or an aromatic hydrocarbon group such as phenyl or tolyl, and $R^2$ is an aliphatic hydrocarbon group of $C_1$–$C_4$, such as methyl, ethyl, propyl or butyl. A typical organotrialkoxysilane is exemplified by methyltriethoxysilane and phenyltriethoxysilane. The partially hydrolyzed condensation product of the organotrialkoxysilane is an initially hydrolyzed condensation product which can be obtained by adding water and a small amount of an acid to the organotrialkoxysilane, and heating same for 1–10 hours at a temperature of 50°–80° C., as stated, for example, in U.S. Pat. No. 3,451,838.

In the present invention, a partially hydrolyzed copolycondensation product of the above-mentioned organotrialkoxysilane with a tetraalkoxysilane can be employed in order to improve the hardness of the coated film. The tetraalkoxysilane is represented by $Si(OR^3)_4$, in which $R^3$ is an aliphatic hydrocarbon group of $C_1$–$C_6$, such as tetramethoxysilane, tetraethoxysilane, tetrapropoxysilane or tetrabutoxysilane. The amount of the tetraalkoxysilane is not more than 40% by weight based on the total amount of the organotrialkoxysilane and tetraalkoxysilane. Alternatively, a mixture of the respective partially hydrolyzed condensation products of an organotrialkoxysilane and a tetraalkoxysilane can be employed.

The partially hydrolyzed condensation product of an organotrialkoxysilane, according to the invention, is preferably used in the form of a solution in an alkyl alcohol of $C_1$-$C_4$, preferably ethyl alcohol.

The organic carboxylic acid of $C_1$-$C_5$, according to the invention, is exemplified by formic acid, acetic acid, propionic acid, valeric acid, pivalic acid and thioacetic acid. The organic carboxylic acid is added to lengthen the pot life of the coating solution and further to improve the adhesion of the coated film. The kind and the amount of the organic carboxylic acid can be selected depending on the coating purpose, coating conditions and hardening conditions. The organic carboxylic acid is generally employed in an amount ranging from 10 to 100 parts by weight, preferably from 60 to 70 parts by weight, per 100 parts of the partially hydrolyzed condensation product of the organotrialkoxysilane.

The hardening catalyst, which can be employed in the composition according to the invention, if desired, can be an inorganic or organic alkaline compound effective for hardening the organopolysiloxane. Examples of the hardening catalyst include sodium phosphate, sodium borate, sodium azide, sodium naphthenate, tetrasodium salt of ethylenediaminetetraacetic acid (EDTA), triethylamine, 1,8-diazabicyclo-(5.4.0)undecane-7, 1,5-diazabicyclo(4.3.0)nonene-5, and tetraethylammonium hydroxide. The hardening catalyst can be incorporated in an amount that varies depending on the selected temperature and time for the hardening. Accordingly, there is no critical limitation on the amount, but an amount ranging from 0.01 to 10 parts by weight, per 100 parts by weight of the partially hydrolyzed condensation product of the organotrialkoxysilane, can be employed.

The anionic surface active agent containing a fluorocarbon chain, employed in the composition according to the invention, is represented by the formula $R^fA$, in which $R^f$ is a fluorinated aliphatic hydrocarbon group, a part or all of the hydrogen atoms of the aliphatic hydrocarbon chain being replaced with fluorine atoms, and A is an anionic functional group stably combined with the $R^f$ group. $R^f$ and A can be directly coupled to each other to form $R^fA$, or they can be stably coupled to each other by means of an appropriate coupling group such as an alkylene group or —OR—, as represented by $R^f$-R-A, $R^f$-O-R-A or

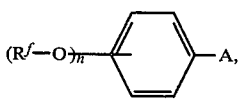

in which R is a divalent aliphatic hydrocarbon group, n is an integer from 1 to 3 and O is an oxygen atom.

It is preferred that $R^f$ is a group derived from an oligomer of perfluoro-propylene in which 2 to 6 monomers are contained. The trimer is especially preferable. The oligomer is very effective because it has a low surface tension due to the function of the side chain of $CF_3$.

The carbon atom number of the group $R^f$ preferably is in the range from 1 to 20 and particularly preferred is a carbon atom number in the range from 6 to 11. $R^f$ can be a straight or branched chain, and it can contain a double bond in the structure, i.e. the aliphatic hydrocarbon can be alkyl or alkenyl.

A is an anionic functional group such as —$SO_3H$, —$SO_3Na$, —$SO_3K$, —COOH, —COONa, and —COOK.

Examples of the anionic surface active agent containing a fluorocarbon chain that can be employed in the present invention include:

$H(CF_2)_6COOH$, $C_7F_{15}COOH$, $C_7F_{15}COOK$, $C_7F_{15}COONa$, $C_8F_{17}SO_3K$, $C_8F_{17}SO_3H$, $C_8F_{17}SO_3Li$, $C_9F_{19}COOH$, $C_9F_{17}SO_3Na$, $C_9F_{17}COONa$, $C_{11}F_{23}COOH$, $C_9F_{17}OC_6H_4COONa$, $C_9F_{17}OC_6H_4SO_3K$, $C_3F_5O$—$C_6H_4SO_3Na$, $3,5$—$(C_3F_5O)_2$—$C_6H_3$—$SO_3Na$, $3,4,5$—$(C_3F_5O)_3$—$C_6H_2$—$SO_3Na$, $C_6F_{11}O$—$C_6H_4$—$SO_3Na$, $C_9F_{17}O$—$C_6H_4$—$SO_3Na$, and $C_9F_{19}O$—$C_6H_4$—$SO_3Na$.

The fluorocarbon-type surface active agent, according to the invention, is preferably incorporated in an amount ranging from 0.01 to 1.0 part by weight per 100 parts by weight of the partially hydrolyzed condensation product of the organotrialkoxysilane. An amount less than 0.01 part cannot provide satisfactory surface smoothness and abrasion resistant property. An amount more than 1.0 part is also unsuitable, because such a large amount cannot bring about a satisfactory surface adhesion of the hardened coated film.

The composition of the invention is used in the form of a coating solution in a solvent such as an alcohol, ketone or ester. An appropriate solvent can be selected from a variety of solvents such as an alcohol solvent, a ketone solvent, an ester solvent, a low boiling solvent, a medium boiling solvent and a high boiling solvent, depending on the kind of a material to be coated and the coating conditions.

Additives such as an ultra-violet absorber, an anti-oxidizing agent, an inorganic material powder, etc., can be additionally incorporated into the coating solution, if desired.

Examples of the coating procedure include the dipping process, the spraying process, the flow coating process and the spin coating process. Any process can be employed to provide a smooth-faced, hardened, coated film and to give the full effect of the fluorocarbon-type surface active agent incorporated in the solution. The coating solution prepared as above is advantageously applied particularly to a base material which is a molded plastic material having an inferior abrasion resistant property. Examples of the plastic material to which the coating solution can be applied include transparent plastic materials such as polymethylmethacrylate, polycarbonate, polystyrene, acrylonitrile-styrene copolymer, methyl methacrylate-styrene copolymer, polydiethyleneglycol bisallylcarbonate, a transparent ABS resin, a rubber-reinforced methacrylic resin, cellulose acetate, cellulose acetate propionate, cellulose acetate butyrate, and polyvinyl chloride, and opaque plastic materials such as an ABS resin and high-impact polystyrene.

The coated plastic material is subjected to the drying and hardening process at a temperature below the thermal deformation temperature of the molded plastic material. Accordingly, the hardening temperature employed varies with the nature of the plastic material that is employed. Generally, the temperature ranges from 40° to 140° C., and preferably ranges from 80° to 120° C. The average film thickness of the hardened film varies with the desired coating purpose, and generally ranges from 1 to 20 microns, and preferably ranges from 5 to 10 microns.

The surface coating composition of the present invention can be advantageously applied to a variety of products such as sunglass lenses made of transparent plastic material, light and heavy lenses, viewfinder lenses for cameras, other optical lenses, transparent covers for meters of a variety of measurement devices, window glass of an automobile, electric vehicle and airplane, and mirrors made of plastic material.

The present invention will be further described by reference to the following illustrative examples.

EXAMPLE 1

A mixture of 120 parts by weight of methyltriethoxysilane, 30 parts by weight of water and 5 ppm of hydrochloric acid was heated for 4 hours and 20 minutes, under stirring and refluxing. In the last period of the heating, water and the by-produced alcohol were removed by evaporation. The residue remaining after the evaporation was then heated at 140° C. for 1 minute. Thirty parts of the thus-obtained partially hydrolyzed condensation product of methyltriethoxysilane, 20 parts of glacial acetic acid (extra pure grade), 1 part of 10% aqueous tetraethylammonium hydroxide and 1 part of 10% aqueous solution of the fluorocarbon-type surface active agent $C_9F_{17}OC_6H_4SO_3Na$ were added to 50 parts of ethanol. In the above and hereafter, the term "part" means "part by weight". The mixture was a homogeneous coating solution.

Into the coating solution was dipped a polymethylmethacrylate resin sheet (100 mm×100 mm×2 mm), and the sheet was then taken out of the solution at a rate of 20 cm/min. with no vibrating action. The thus-treated sheet was immediately placed in a hot-air oven and heated at 90° C. for 10 hours to dry and harden the coated organopolysiloxane coating composition. The thus-obtained coating sheet was evaluated in the following manner.

(1) Measurement of Abrasion Resistant Property

The surface of the coating sheet was subjected to abrasion in a Taber Abrasion Testing Device (prepared by Yasuda Seiki, Japan) under the conditions of a load of 500 g., 100 cycles, using the wheel of CS-10F. The coating sheet was then measured in a Haze Meter (prepared by Suga Testing Machine Corp., Japan) to determine the total light transmittance and the scattered light. The abrasion resistant property is expressed by the value of the haze as calculated below.

$$\text{Haze (\%)} = \frac{\text{Scattered Light}}{\text{Total Light Transmittance}} \times 100$$

(2) Surface Friction Resistance

A pair of sheets (60 mm×60 mm) to be tested were placed one upon the other on a horizontal base. The lower sheet was fixed on the base, and on the upper sheet was placed an iron weight (p=160 g., 60 mm×60 mm). The upper sheet was adhered to the weight. One end of a string was tied to the center of one side of the weight and the other end was tied to the Tensile Testing Machine (manufactured by Toyo Seiki Corp., Japan). The string was pulled by the testing machine.—Friction: F(g) exerted by the Tensile Testing Machine to cause relative sliding of the sheets.

The direction of the string was altered from horizontal to vertical by introducing a pulley on the mid-portion of the string. The friction was produced between the upper sheet and the lower sheet.

The surface friction resistance is calculated by the following equation.

$$\text{Friction Coefficient} = F/P$$

(3) Light Transmittance

The sheet was measured to determine the light transmittance by means of a color difference meter (Suga Testing Machine Corp.)

(4) Adhesive Property of Coated Film

Across the sheet to be tested were formed eleven cut lines at intervals of 1 mm each to obtain a crosshatching of the coating film by means of the Cross Cut Testing Machine (manufactured by Toyo Seiki Corp.) with a single-edged razor and 200 g. of load. A regenerated cellulose adhesive tape was adhered on the crosshatched coating, and the tape was strongly pulled in the vertical direction from the sheet. The possible separation of the coating film from the base resin sheet was observed. The results measured and observed on the tested sheet are set forth in Table 1.

Comparative Example 1

The procedure described in Example 1 was repeated except that the fluorocarbon-type surface active agent was not incorporated. The results measured and observed on the tested sheet are set forth in Table 1.

Comparative Example 2

The methacrylic resin sheet employed in Example 1, per se (without the coating), was subjected to the same measurements and observations. The results measured and observed on the tested sheet are set forth in Table 1.

As is clear from the data set forth in Table 1, the sheet coated with the composition containing the fluorocarbon-type surface active agent is more excellent in the anti-abrasion property and the surface friction resistance compared with the sheet that was coated with the composition containing no fluorocarbon-type surface active agent (Comparative Example 1) and the sheet with no coating (Comparative Example 2). Moreover, the film obtained in Example 1 was transparent even though it contained the fluorocarbon-type surface active agent, and the fluorocarbon property of the coated film was satisfactory.

EXAMPLE 2

The procedure described in Example 1 was repeated except that the surface active agent $C_9F_{17}COONa$ was employed in place of the surface active agent $C_9F_{17}OC_6H_4SO_3Na$ employed in Example 1, and a coating solution was prepared.

Into a solution of γ-aminopropyltriethoxysilane in n-butyl alcohol was dipped a polycarbonate sheet (100 mm×100 mm×2 mm), and the sheet was then taken out of the solution at a rate of 20 cm/min. The thus-treated sheet was immediately introduced into a hot-air oven and heated at 90° C. for 2 hours to provide an undercoating layer.

In the coating solution was dipped the polycarbonate sheet which had been provided with the under-coating layer, and the thus-treated sheet was immediately introduced into a hot-air oven and heated at 110° C. for 5 hours.

Ths thus-obtained coated sheet was evaluated in the same manner as described in Example 1. The results are set forth in Table 1. The properties of the coated film are substantially identical to those of the coated film prepared in Example 1.

EXAMPLE 3

In 27 g. of ethanol was dissolved 27 g. of the partially hydrolyzed condensation product of methyltriethoxysilane (trade name: Glassresin 650, produced by Owens Illinois, Inc.), and to the solution were added 3 g. of tetraethoxysilane and 3 g. of water. The mixture was heated under stirring at 80° C. for 4 hours to effect the hydrolysis and the dehydration condensation to obtain an ethanolic solution of a block copolycondensate. Sixty parts by weight of the thus-obtained ethanolic solution of the partially hydrolyzed copolycondensate of methyltriethoxysilane and tetraethoxysilane, 20 parts by weight of glacial acetic acid (extra pure grade), 1 part by weight of 10% aqueous tetraethylammonium hydroxide, 1 part by weight of 10% aqueous solution of the fluorocarbon-type surface active agent $C_9F_{17}OC_6H_4SO_3Na$ and 20 parts by weight of ethanol were mixed to make a coating solution. The thus-obtained coating solution was coated on a polymethylmethacrylate resin sheet in the same manner as described in Example 1. The coated sheet was evaluated in the same manner as described in Example 1. The results are set forth in Table 1. The properties of the coated film are substantially identical to those of the coated film prepared in Example 1.

TABLE 1

| | Haze (%) after Taber abrasion test | Surface friction resistance | Light transmittance | Adhesion of coated film |
|---|---|---|---|---|
| Example 1 | 1.2 | 0.14 | 93 | Good |
| Example 2 | 1.5 | 0.15 | 89 | Good |
| Example 3 | 1.4 | 0.14 | 93 | Good |
| Comparative Example 1 | 4 | 0.45 | 93 | Good |
| Comparative Example 2 | 25 | 0.49 | 91 | — |

Remarks:

| | Base resin | Surface active agent |
|---|---|---|
| Example 1 | Methacrylic resin sheet (coated) | $C_9F_{17}OC_6H_4SO_3Na$ |
| Example 2 | Polycarbonate resin sheet (coated) | $C_9F_{17}COONa$ |
| Example 3 | Methacrylic resin sheet (coated) | $C_9F_{17}OC_6H_4SO_3Na$ |
| Comparative Example 1 | Methacrylic resin sheet (coated) | None |
| Comparative Example 2 | Methacrylic resin sheet (uncoated) | — |

The embodiments of the invention in which an exclusive property or privilege is claimed are defined as follows:

1. A coating composition comprising:
   A. 100 parts by weight of partially hydrolyzed condensation product of from 60 to 100% by weight of organotrialkoxysilane having the formula $R^1Si(OR^2)_3$ in which $R^1$ is an aliphatic hydrocarbon containing from 1 to 4 carbon atoms or an aromatic hydrocarbon, and $R^2$ is an aliphatic hydrocarbon having 1 to 4 carbon atoms, and from 0 to 40% by weight of tetraalkoxysilane of the formula $Si(OR^3)_4$ wherein $R^3$ is an aliphatic hydrocarbon having 1 to 6 carbon atoms;
   B. from 10 to 100 parts by weight of an organic carboxylic acid having 1 to 5 carbon atoms; and
   C. from 0.01 to 1.0 parts by weight of a fluorocarbon anionic surface active agent.

2. A coating composition as claimed in claim 1 in which $R^1$ is selected from the group consisting of methyl, ethyl, propyl, butyl, phenyl and tolyl, $R^2$ is selected from the group consisting of methyl, ethyl, propyl and butyl, and $R^3$ is selected from the group consisting of methyl, ethyl, propyl and butyl.

3. A coating composition as claimed in claim 1 in which said organic carboxylic acid is selected from the group consisting of formic acid, acetic acid, propionic acid, valeric acid, pivalic acid and thioacetic acid, and the amount of said organic carboxylic acid is from 60 to 70 parts by weight, per 100 parts by weight, of said partially hydrolyzed condensation product.

4. A coating composition as claimed in claim 1, claim 2 or claim 3 wherein said fluorocarbon anionic surface active agent is selected from the group consisting of $R^f$-A, $R^f$-R-A, $R^f$-O-R-A and

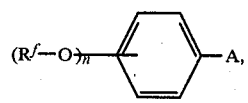

wherein $R^f$ is alkyl or alkenyl having from 1 to 20 carbon atoms and wherein from one to all of the hydrogen atoms are replaced by fluorine atoms, A is —$SO_3H$, —$SO_3Na$, —$SO_3K$, —$SO_3Li$, —COOH, —COONa or —COOK, R is a divalent aliphatic hydrocarbon group and n is an integer of 1 to 3.

5. A coating composition as claimed in claim 1 wherein said fluorocarbon anionic surface active agent is selected from the group consisting of $H(CF_2)_6COOH$, $C_7F_{15}COOH$, $C_7F_{15}COOK$, $C_7F_{15}COONa$, $C_8F_{17}SO_3K$, $C_8F_{17}SO_3H$, $C_8F_{17}SO_3Li$, $C_9F_{19}COOH$, $C_9F_{17}SO_3Na$, $C_9F_{17}COONa$, $C_{11}F_{23}COOH$, $C_9F_{17}OC_6H_4COONa$, $C_9F_{17}OC_6H_4SO_3K$, $C_3F_5O-C_6H_4SO_3Na$, $3,5-(C_3F_5O)_2-C_6H_3-SO_3Na$, $3,4,5-(C_3F_5O)_3-C_6H_2-SO_3Na$, $C_6F_{11}O-C_6H_4-SO_3Na$, $C_9F_{17}O-C_6H_4-SO_3Na$, and $C_9F_{19}O-C_6H_4-SO_3Na$.

6. A coating composition as claimed in claim 1 containing an effective amount of an inorganic or organic alkaline hardening catalyst for cross-linking said partially hydrolyzed condensation product to form a coating film.

7. A coating solution consisting essentially of a coating composition as claimed in claim 6 dissolved in an inert organic solvent.

8. A coating process which comprises applying to a substrate a thin coating film of a coating solution as claimed in claim 7 and then heating the coated substrate, at a temperature below the thermal deformation temperature of said substrate, to form a hardened dry coating film on said substrate.

9. A coated product prepared by the process of claim 8.

10. A coating composition as claimed in claim 4 in which $R^f$ is an oligomer containing from 2 to 6 monomer units of perfluoro-propylene.

11. A coating composition as claimed in claim 4 in which $R^f$ is an oligomer containing 3 monomer units of perfluoropropylene.

* * * * *